US012774222B2

(12) United States Patent
Choi et al.

(10) Patent No.: US 12,774,222 B2
(45) Date of Patent: Oct. 27, 2026

(54) METHOD FOR PURIFYING BRINE GENERATED IN AROMATIC COMPOUND PRODUCING PROCESS

(71) Applicant: HANWHA SOLUTIONS CORPORATION, Seoul (KR)

(72) Inventors: Ji Hye Choi, Daejeon (KR); Namjin Jang, Daejeon (KR); Jinho Park, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 523 days.

(21) Appl. No.: 18/264,088

(22) PCT Filed: Jan. 26, 2022

(86) PCT No.: PCT/KR2022/001363
§ 371 (c)(1),
(2) Date: Aug. 3, 2023

(87) PCT Pub. No.: WO2022/169179
PCT Pub. Date: Aug. 11, 2022

(65) Prior Publication Data

US 2024/0124328 A1 Apr. 18, 2024

(30) Foreign Application Priority Data

Feb. 3, 2021 (KR) ........................ 10-2021-0015468

(51) Int. Cl.
*C02F 1/12* (2023.01)
*C02F 1/26* (2023.01)
*C02F 101/30* (2006.01)

(52) U.S. Cl.
CPC .................. *C02F 1/12* (2013.01); *C02F 1/26* (2013.01); *C02F 2101/30* (2013.01);
(Continued)

(58) Field of Classification Search
None
See application file for complete search history.

(56) References Cited

U.S. PATENT DOCUMENTS 6,355,145 B1 3/2002 Kresnyak
9,169,131 B1 10/2015 Warbington
(Continued)

FOREIGN PATENT DOCUMENTS

CN 105503573 A 4/2016
DE 103 32 758 A1 5/2004
(Continued)

OTHER PUBLICATIONS

European Search Report for a corresponding EP Patent Application, dated Nov. 4, 2024.
KR Office action issued on Jul. 1, 2024.

*Primary Examiner* — Richard C Gurtowski
(74) *Attorney, Agent, or Firm* — Harvest IP Law, LLP

(57) ABSTRACT

The present invention relates to a method for removing a low-boiling point organic compound and, more specifically, to a method for removing a low-boiling point organic compound, capable of suppressing a formation of a salt when the low-boiling point organic compound is removed from a brine solution produced in a process of preparing an aromatic compound.
Since the method for removing a low-boiling point organic compound according to the present invention suppresses salt precipitation when a low-boiling point organic compound in brine is removed, it is easy to maintain process facilities and the low-boiling point organic compound may be easily removed.

7 Claims, 1 Drawing Sheet

(52) U.S. Cl.
CPC ...... *C02F 2209/02* (2013.01); *C02F 2209/06* (2013.01); *C02F 2209/40* (2013.01)

(56) References Cited

U.S. PATENT DOCUMENTS

| | | | | |
|---|---|---|---|---|
| 2003/0127400 | A1 | 7/2003 | Kresnyak | |
| 2004/0147795 | A1 * | 7/2004 | Randolph | C10G 45/60 585/734 |
| 2004/0180447 | A1 * | 9/2004 | Ament | G01N 33/2829 422/82.01 |
| 2007/0079812 | A1 * | 4/2007 | Ahn | F02D 41/107 123/486 |
| 2013/0098752 | A1 | 4/2013 | Castillo-Welter | |
| 2013/0153401 | A1 | 6/2013 | Gilbeau | |
| 2016/0083267 | A1 | 3/2016 | Hammon | |

FOREIGN PATENT DOCUMENTS

| | | | |
|---|---|---|---|
| KR | 20100068246 | A | 6/2010 |
| KR | 20130101032 | A | 9/2013 |
| KR | 20160140818 | A | 12/2016 |
| KR | 20170106804 | A | 9/2017 |

* cited by examiner

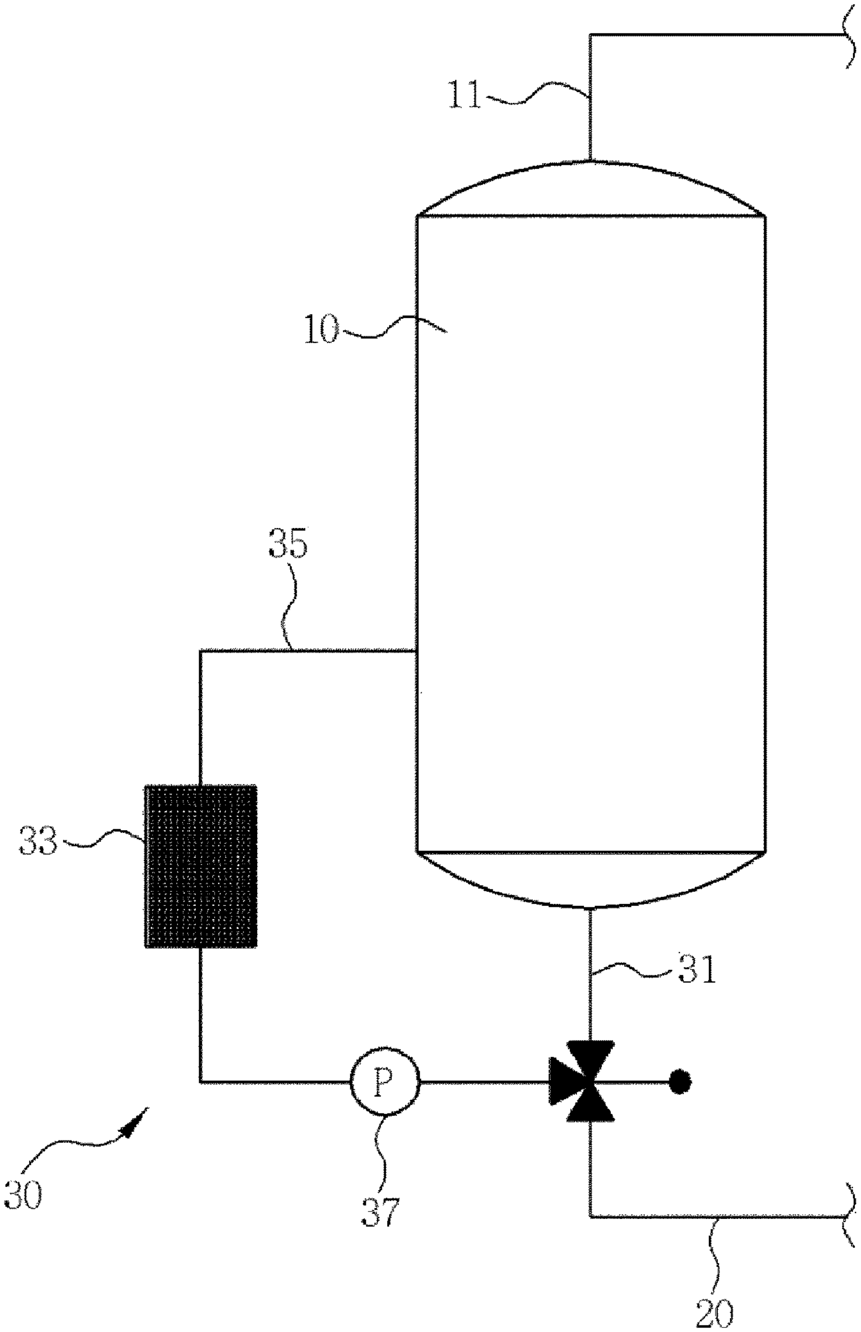
11
10
35
33
31
P
30
37
20

METHOD FOR PURIFYING BRINE GENERATED IN AROMATIC COMPOUND PRODUCING PROCESS

CROSS-REFERENCE TO RELATED APPLICATION(S)

This application is a National Stage of International Application No. PCT/KR2022/001363 filed on Jan. 26, 2022, claiming priority based on Korean Patent Application No. 10-2021-0015468 filed on Feb. 3, 2021, the disclosure of which is incorporated herein by reference in its entirety.

TECHNICAL FIELD

The present invention relates to a method for removing a low-boiling point organic compound, and more particularly, to a method for removing a low-boiling point organic compound in a brine solution produced in a process of preparing an aromatic compound, including a method for purifying a brine solution.

BACKGROUND ART

Aromatic compounds are widely used as basic raw materials of organic synthesis in the pharmaceutical and chemical fields.

Specifically, cresol which is one of the aromatic compounds is being used in manufacture of synthetic resins such as local anesthetics, disinfectants, surfactants, or semiconductor sealing agents. Cresol is found in a tar acid form in various kinds of plants (wood tar), crude oil, coal tar, and the like, and is also produced by natural organic matter which is decomposed by microorganisms in soil and water. Cresol-like compounds may be obtained by distilling and purifying those included in a naturally existing mixture, or obtained by organic synthesis.

However, since many materials having physical and chemical properties similar to those of cresol, such as pyridine, methyl pyridine, aniline, and xylenol, are included in the natural mixture such as coal tar, distillation is not easy, and since these materials also remain in a purified resulting material, it is not easy to obtain high-purity cresol, and thus, distillation is not appropriate for the above use, and cresol is often prepared by organic synthesis.

Korean Patent Laid-Open Publication No. 10-2017-0106804A which was previously filed by the present applicant discloses a method for preparing cresol including: a reaction step of reacting halotoluene and a basic aqueous solution; a step of acidifying by adding an acid; and an extraction step of adding an organic solvent to extract cresol from a water-soluble layer into an organic solvent layer.

In the above method, a water-soluble layer which is finally phase-separated is a brine aqueous solution including 20 wt % of NaCl, and to the aqueous solution, a low-boiling point organic compound such as MTBE is added in order for cresol produced in the reaction step to be more dissolved in the organic solvent layer in the extraction step, and since the low-boiling point organic compound as such is present at 1000 ppm or more in the brine solution layer, the brine solution may not be recycled in a formation process. Thus, there is a problem of eventually discarding the brine solution.

In order to usually recycle the brine which is formed in the process of preparing an aromatic compound including a chlorine group using caustic soda in the formation process, the content of the organic compound should be adjusted to 1 ppm or less, so that a side reaction is not caused in a reaction such as electrolysis in the formation process. That is, for brine recycling, a step of adjusting the content of the organic compound as such is very important.

Thus, in order to lower the content of the organic compound, a method of distilling with a heat exchanger has been devised, but when distilling is performed with a heat exchanger, NaCl is precipitated to cause scaling inside the heat exchanger and heat exchange efficiency is decreased.

In addition, since NaCl is precipitated also in a distillation tower to decrease the distillation efficiency, there are a lot of problems in a long-term use.

DISCLOSURE

Technical Problem

An object of the present invention is to provide a method for removing a low-boiling point organic compound, which may prevent salt precipitation when the low-boiling point organic compound in brine produced in a process of preparing an aromatic compound is removed by distillation.

Technical Solution

In one general aspect, a method for removing a low-boiling point organic compound in a brine solution by distilling the brine solution produced in a process of preparing an aromatic compound in a distillation tower includes: heat-exchanging the brine solution including the low-boiling point organic compound while forcing the brine solution to circulate by a forced circulation heat exchanger so that the following equation is satisfied:

$$V_e = \frac{C}{\sqrt{\rho_m}} \qquad \text{[Equation]}$$

$$10 \le C \le 200$$

wherein $V_e$ is a fluid speed (ft/s), C is an empirical constant, and $\rho_m$ is a fluid density (lb/ft$^3$).

In the method for removing a low-boiling point organic compound according to an exemplary embodiment of the present invention, in order to remove the low-boiling point organic material included in the brine solution produced during the process of preparing an aromatic compound, extraction in which an organic solvent is added to extract the aromatic compound from a water-soluble layer into an organic solvent layer may be included, wherein the brine solution is the water-soluble layer in the extraction.

In the method for removing a low-boiling point organic compound according to an exemplary embodiment of the present invention, the low-boiling point organic compound may be the organic solvent added in the extraction in which the aromatic compound is extracted.

In the method for removing a low-boiling point organic compound according to an exemplary embodiment of the present invention, water may be sprayed from an upper portion of the distillation tower into the brine solution.

In the method for removing a low-boiling point organic compound according to an exemplary embodiment of the present invention, a temperature of the water may be the same as a distillation temperature.

In the method for removing a low-boiling point organic compound according to an exemplary embodiment of the present invention present invention, the adding of an acid may be performed using an acid having a pKa value of −6 or less.

In the method for removing a low-boiling point organic compound according to an exemplary embodiment of the present invention, in the extraction in which the aromatic compound is extracted, the organic solvent may have a DI value of 20 or less.

In the method for removing a low-boiling point organic compound according to an exemplary embodiment of the present invention, the extraction with an organic solvent may be repeated twice or more.

In another general aspect, an apparatus for removing a low-boiling point organic compound includes: a distillation tower; and a brine forced circulation unit including: a forced circulation heat exchanger which is supplied with a brine solution produced in a process of preparing an aromatic compound from a supply line and exchanges heat, a first circulation line which supplies the brine solution which is heat-exchanged through the heat exchanger to the distillation tower, and a second circulation line which supplies the brine solution supplied from the distillation tower to the forced circulation heat exchanger.

In the apparatus for removing a low-boiling point organic compound according to an exemplary embodiment of the present invention, a water spray unit which includes at least one nozzle disposed on the distillation tower to spray water into the distillation tower may be further included.

In the apparatus for removing a low-boiling point organic compound according to an exemplary embodiment of the present invention, in the brine forced circulation unit, the second circulation line may diverge from the supply line.

Advantageous Effects

Since the method for removing a low-boiling point organic compound according to the present invention suppresses salt precipitation when a low-boiling point organic compound in brine is removed, it is easy to maintain process facilities and the low-boiling point organic compound may be easily removed.

In addition, since brine having high purity may be obtained by the method for removing a low-boiling point organic compound according to the present invention, brine having high purity may be reused in a formation process, and thus, process efficiency may be further increased.

DESCRIPTION OF DRAWINGS

FIG. 1 illustrates a schematic diagram of an apparatus for removing a low-boiling point organic compound according to an exemplary embodiment of the present invention.

BEST MODE

Technical terms and scientific terms used in the present specification have the general meanings understood by those skilled in the art to which the present invention pertains unless otherwise defined, and a description for the known function and configuration obscuring the gist of the present invention will be omitted in the following description and the accompanying drawings.

In addition, the singular form used in the present specification may be intended to also include a plural form, unless otherwise indicated in the context.

In addition, units used in the present specification without particular mention are based on weights, and as an example, a unit of % or ratio refers to a wt % or a weight ratio and wt % refers to wt % of any one component in a total composition, unless otherwise defined.

In addition, the numerical range used in the present specification includes all values within the range including the lower limit and the upper limit, increments logically derived in a form and span of a defined range, all double limited values, and all possible combinations of the upper limit and the lower limit in the numerical range defined in different forms. Unless otherwise defined in the specification of the present invention, values which may be outside a numerical range due to experimental error or rounding off of a value are also included in the defined numerical range.

The term "comprise" in the present specification is an open-ended description having a meaning equivalent to the term such as "is/are provided", "contain", "have", or "is/are characterized", and does not exclude elements, materials, or processes which are not further listed.

The term "aromatic compound" throughout the present specification refers to an organic compound containing a benzene ring in a molecule, and encompasses all of ortho, meta, and para forms. A non-limiting specific example may be ortho, meta, and para cresols.

Conventionally, a brine aqueous solution including 20 wt % of NaCl formed in a process of preparing an aromatic compound may include other organic materials used in a previous process. In this case, there is a problem of eventually discarding the brine solution. Thus, in order to lower the content of the organic compound in the brine solution, a method of distilling with a heat exchanger has been devised, but when distilling is performed with a heat exchanger, NaCl is precipitated to cause scaling inside the heat exchanger and heat exchange efficiency is decreased. In addition, since NaCl is precipitated also in a distillation tower to decrease the distillation efficiency, there are a lot of problems in a long-term use.

The present invention is a method for removing a low-boiling point organic compound in a brine solution by distilling the brine solution produced in a process of preparing an aromatic compound in a distillation tower, the method including: heat-exchanging the brine solution including the low-boiling point organic compound while forcing the brine solution to circulate by a forced circulation heat exchanger so that the following equation is satisfied:

$$V_e = \frac{C}{\sqrt{\rho_m}} \qquad \text{[Equation]}$$

$$10 \leq C \leq 200$$

wherein $V_e$ is a fluid speed (ft/s), C is an empirical constant, and $\rho_m$ is a fluid density (lb/ft$^3$).

The distilled brine solution satisfies the above equation, and is forced to circulate with the heat exchanger, thereby preventing salt precipitation by a linear speed. Thus, since a salt (NaCl) is prevented from being deposited on removal facilities such as a heat exchanger, piping, and a distillation tower which causes formation of scale and the like, a facility for removing the low-boiling point organic compound may be stably operated for a long time, and thus, it is easy to maintain the facility. Furthermore, since the brine solution from which the low-boiling point organic compound has been removed by the method as such has high purity, it may be directly put into the formation process. That is, the present removal method allows preparation of a brine solution having high utility value.

Specifically, in the above equation, C, which is an empirical constant, may be 10 to 200, as described in the above equation, but preferably 50 to 100, and more preferably 70 to 90. Within the range, suppression of salt precipitation may be maximized.

The brine solution of the present invention is produced in the process of preparing an aromatic compound. Generally, in order to remove organic materials in a system having a high NaCl solubility at a high temperature like 10-25% (15-23%, 20-22%) NaCl, an extraction process and a distillation process are introduced.

The extraction process may include extraction in which an oil-soluble layer and a water-soluble are separated, the oil-soluble layer is recovered, and an organic solvent is added to the separated water-soluble layer to extract cresol from the water-soluble layer into an organic solvent layer. Herein, the brine solution refers to the water-soluble layer in the extraction.

The separating of the aromatic compound from the oil-soluble layer and the water-soluble layer and then recovering the oil-soluble layer may be separating of a product having a pH adjusted by adding an acid in the previous step into an oil-soluble layer and a water-soluble layer and then recovering the oil-soluble layer, and the recovery of the oil-soluble layer may be performed by a method such as recovering only the oil-soluble layer in a layer-separated state or recovering only the water-soluble layer in a layer-separated state.

The extraction may be performed once or more, preferably twice or more. By repeating the step as such, a residual aromatic compound in the water-soluble layer may be obtained in a high yield.

As the method of separating the oil-soluble layer and the water-soluble layer in the present step, various known methods may be adopted. As an example, separation may be performed by upper layer separation (decanting).

In addition, the present step may be performed at a temperature of 0° C. or higher and 100° C. or lower, and situationally, an operation temperature may be adjusted between 0° C. and 100° C., but considering actual operating costs, a temperature of 40° C. to 60° C. may be appropriate.

Then, the extraction in which an organic solvent is added to the separated water-soluble layer to perform extraction from the water-soluble layer into an organic solvent layer is intended to further increase the yield of the aromatic compound.

A usable organic solvent herein may be any organic solvent which may fractionate the aromatic compound in the water-soluble layer, and those having a DI value of about 20 or less may be used. A DI value is a dielectric constant or relative permittivity, and the value refers to a ratio of an absolute permittivity of a material to a vacuum permittivity in a vacuum state. That is, as the dielectric constant is higher, polarity like water is shown, and as the dielectric constant is lower, non-polarity is shown, which is favorable for extraction from the water-soluble layer.

For example, benzene, toluene, methyl-t-butyl ether (MTBE), methyl isobutyl ketone (MIBK), isobutyl acetate (IBA), or a mixture thereof may be used, and other than that, any organic solvent commonly used in the art to which the present invention pertains, such as hexane, heptane, cyclohexane, or xylene may be used without a particular limitation.

The organic solvent may be 10 parts by weight or more and 200 parts by weight or less with respect to a total amount of 100 parts by weight of a product produced in the producing of the aromatic compound. More specifically, it may be 20 parts by weight or more and 100 parts by weight or less.

The extraction may be performed at a temperature of 0° C. or higher and 60° C. or lower. More specifically, the step may be performed at a temperature of 30° C. or higher and 50° C. or lower. When the temperature is too low during the extraction, an extraction speed may be reduced. In addition, though an optimal operating temperature of an upper layer separation in the former stage of the extraction process is 40° C. to 60° C., a cooler is installed for increasing extraction efficiency to adjust the temperature.

Thereafter, the water-soluble layer after the extraction of the aromatic compound is completed may have a concentration of about 20 w % as a brine solution.

In an exemplary embodiment of the present invention, the low-boiling point organic compound in the brine solution produced in the above-described process may be removed. Herein, the low boiling point refers to a boiling point of 150° C. or lower. Specifically, the low-boiling point organic compound may be the organic solvent described above.

In the present invention, the brine solution may be supplied to the distillation tower at a temperature of 20° C. to 100° C., specifically 50° C. to 70° C. by the heat exchanger, in which the linear speed follows the equation described above.

In an exemplary embodiment of the present invention, the distillation in the distillation tower may be performed in the conditions of a pressure of 0 barg to 2 barg and a temperature of 60° C. to 150° C., but is not limited thereto.

In an exemplary embodiment of the present invention, during the distillation, water may be sprayed from an upper portion of the distillation tower into the brine solution accommodated in the distillation tower. Water has a washing effect and may further prevent scale formation by a salt. Herein, a temperature of the water may be the same as a distillation temperature, but is not limited thereto. However, since water is sprayed in the above temperature range, change in distillation conditions by water is prevented to facilitate the maintenance of process conditions.

Hereinafter, a removal apparatus which may remove a low-boiling point organic compound by the method for removing a low-boiling point organic compound described above will be described.

FIG. 1 illustrates an apparatus for removing a low-boiling point organic compound according to an exemplary embodiment of the present invention.

Referring to FIG. 1, the apparatus for removing a low-boiling point organic compound of the present invention may include: a distillation tower 10; and a brine forced circulation unit 30 including: a forced circulation heat exchanger 33 which is supplied with a brine solution produced in a process of preparing cresol from a supply line 20 and exchanges heat, a first circulation line 35 which supplies the brine solution which is heat-exchanged through the heat exchanger 33 to the distillation tower 10, and a second circulation line 31 which supplies the brine solution supplied from the distillation tower 10 to the forced circulation heat exchanger 33. Since the apparatus for removing a low-boiling point organic compound as such may force the brine solution to circulate to supply the brine solution, formation of salt in the heat exchanger 33 and the distillation tower 10 may be prevented.

Specifically, the distillation tower 10 is not limited as long as it is a distillation device used in the art.

The brine forced circulation unit may be provided by the second circulation line 31 diverging from the supply line 20, as shown in the drawing, but is not limited thereto, the supply line 20 may be connected to the forced circulation heat exchanger 33, and the second circulation line 31 may separately connect the distillation tower 10 and the forced circulation heat exchanger 33. When the second circulation line 31 diverges from the supply line 20, it may be connected by a 3 way valve, as shown in the drawing, and is controlled by a control unit to supply the brine solution to the heat exchanger 33 or supply the brine solution by circulating the brine solution to the distillation tower 10 and the heat exchanger 33.

The forced circulation heat exchanger 33 is a heat exchanger 33 including a pump 37, and the brine solution may have a constant linear speed by the pump 37. Herein, the linear speed of the brine solution satisfies the above equation, and hereinafter, the detailed description will be omitted.

In an exemplary embodiment of the present invention, a water spray unit (not shown) which includes at least one nozzle disposed on the distillation tower 10 to spray water into the distillation tower 10 may be further included.

The water spray unit sprays water to the brine solution supplied to the distillation tower 10 by the forced circulation heat exchanger, thereby further preventing scaling by the salt in the distillation tower 10. The water spray unit may be supplied with water through tap water or water reservoir installed outside the distillation tower 10. As the nozzle, nozzles known in the art may be used.

Hereinafter, referring to the drawing, a process of removing the low-boiling point organic compound in the brine solution through the apparatus of the present invention will be described.

Referring to FIG. 1, the brine solution of the present invention is supplied to the forced circulation heat exchanger 33 through the supply line 20, and the brine solution having the constant linear speed by the forced circulation heat exchanger 33 is supplied into the distillation tower 10 through the first circulation line 35. Herein, unlike what is shown in the drawing, water may be supplied to the upper portion of the distillation tower 10. The brine solution after first distillation is completed may be supplied to the forced circulation heat exchanger 33 again through the second circulation line 31, and the low-boiling point organic compound in the brine solution may be removed with a high removal rate by the circulation process as such.

Hereinafter, the preferred examples and the comparative examples of the present invention will be described. However, the following examples are only a preferred exemplary embodiment of the present invention, and the present invention is not limited thereto.

Example 1

Production of cresolate by hydrolysis reaction: A NaOH aqueous solution (10 wt %) and chlorotoluene were added to a continuous reactor at a mole ratio of 2.5:1 (NaOH: chlorotoluene), the conditions of 400° C. and 300 atm were maintained for 30 minutes, and the hydrolysis reaction of chlorotoluene was performed under the basic conditions of about pH 13 to produce a cresolate (cresol ion) mixture.

PH adjustment and separation of oil-soluble layer and water-soluble layer: HCl was added to a product of the hydrolysis reaction to adjust each of the pH of the product to 1. Thereafter, the product was transferred to a decanter, and upper separation (decanting) was performed at 45° C. for 5 minutes so that the oil-soluble layer and the water-soluble layer are separated. As the pH was lowered, the oil-soluble layer and the water-soluble layer were rapidly separated, and it was confirmed that the separation was almost completed within 2 minutes.

At this time, the oil-soluble layer was separated to the upper portion, and the water-soluble layer was separated to a lower portion of the decanter of each example. Here, the lower water-soluble layer other than a boundary surface was separately sampled, and the oil-soluble layer was separately recovered. Thereafter, the concentration of cresol in the sampled water-soluble layer was measured. Concentration analysis was performed using high performance liquid chromatography (HPLC), and a C18 column was used, in which the lower limit of the detectable concentration was 10 ppm.

Thereafter, methyl tertiary butyl ether (MTBE) at 40° C. was added to the water-soluble layer sample to extract a residual aromatic compound. Then, after stirring for about 20 seconds, 2-stage extraction was performed, and a part of a water-soluble layer in an upper MTBE layer and a lower water-soluble layer was sampled to analyze the concentration of residual cresol. Concentration analysis was performed using high performance liquid chromatography (HPLC), and a C18 column was used, in which the lower limit of the detectable concentration was 10 ppm. As a result of measurement, all samples were determined to be "undetectable", which means that the concentration of residual cresol was less than 10 ppm.

Removal of low-boiling point organic compound: MTBE which was used as the extraction solvent was included at its solubility in the water-soluble layer after the cresol extraction was completed, that is, the brine solution, and in order to remove MTBE, the brine solution was supplied to the distillation tower. A low-boiling point organic material was removed to the upper portion of the distillation tower, and the brine solution was supplied at a linear speed at which the brine solution was circulated by the forced circulation heat exchanger, which was set so that the C value was 80 in the above equation. Distillation was performed at a pressure of 0.1 barg and a temperature of 125° C. (±5° C.) in the distillation tower.

After removing the low-boiling point organic material, the concentration of the residual organic material was analyzed using a total organic carbon amount analyzer (TOC), and the concentration of less than 100 ppm was confirmed. Thereafter, the content of the organic material was adjusted to 1 ppm or less through an adsorption tower, and brine was recycled to a formation process.

Comparative Example 1

A low-boiling point organic compound was removed in the same manner as in Example 1, except that the brine solution was forced to circulate at a constant linear speed in which the C value was set to 300 unlike the linear speed of Example 1, in the removing of a low-boiling point organic compound of Example 1.

The brine solution from which the low-boiling point organic compound had been removed in Example 1 had a concentration of the low-boiling point organic compound of less than 10 ppm, and it was confirmed that a very high-purity brine solution was able to be obtained.

In addition, when salt formation in the facility was observed with the naked eye after the processes of Example 1 and Comparative Example 1, the salt was not observed in Example 1, but the salt was observed in the facility in Comparative Example 1.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A method for removing a low-boiling point organic compound in a brine solution by distilling a brine solution produced in a process of preparing an aromatic compound in a distillation tower, the method comprising:

heat-exchanging the brine solution including the low-boiling point organic compound while forcing the brine solution to circulate by a forced circulation heat exchanger so that the following equation is satisfied:

$$V_e = \frac{C}{\sqrt{\rho_m}} \quad \text{[Equation]}$$

$$10 \leq C \leq 200$$

wherein $V_e$ is a fluid speed (ft/s), C is an empirical constant, and $P_m$ is a fluid density (1b/ft$^3$).

2. The method for removing a low-boiling point organic compound of claim 1, wherein in order to remove the low-boiling point organic material included in the brine solution produced during the process of preparing the aromatic compound, extraction in which an organic solvent is added to extract the aromatic compound from a water-soluble layer into an organic solvent layer is included, and the brine solution is the water-soluble layer in the extraction.

3. The method for removing a low-boiling point organic compound of claim 2, wherein the low-boiling point organic compound is the organic solvent which is added in the extraction in which the aromatic compound is extracted.

4. The method for removing a low-boiling point organic compound of claim 1, wherein water is sprayed from an upper portion of the distillation tower to the brine solution.

5. The method for removing a low-boiling point organic compound of claim 4, wherein a temperature of the water is the same as a distillation temperature.

6. The method for removing a low-boiling point organic compound of claim 2, wherein in the extraction in which the aromatic compound is extracted, the organic solvent has a DI value of 20 or less.

7. The method for removing a low-boiling point organic compound of claim 2, wherein the extraction with an organic solvent is repeated twice or more.

* * * * *